US007630494B2

(12) United States Patent
Luthi

(10) Patent No.: US 7,630,494 B2
(45) Date of Patent: Dec. 8, 2009

(54) FORGERY-PROOF PACKAGING MATERIAL WITH A SECURITY FEATURE

(75) Inventor: Markus Luthi, Marthalen (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 733 days.

(21) Appl. No.: 10/974,940

(22) Filed: Oct. 28, 2004

(65) Prior Publication Data

US 2005/0089163 A1 Apr. 28, 2005

(30) Foreign Application Priority Data

Oct. 28, 2003 (EP) .................................. 03405776

(51) Int. Cl.
*G09C 5/00* (2006.01)

(52) U.S. Cl. .......................................... 380/54; 380/37

(58) Field of Classification Search .................. 380/54, 380/37

See application file for complete search history.

(56) References Cited

U.S. PATENT DOCUMENTS 4,337,480 A * 6/1982 Bourassin et al. ........... 348/552
4,424,587 A * 1/1984 Wevelsiep et al. ........... 382/289
4,630,296 A * 12/1986 Haaker et al. .................. 378/2
4,853,779 A * 8/1989 Hammer et al. ........ 375/240.22
5,177,796 A * 1/1993 Feig et al. .................... 382/236
5,282,255 A * 1/1994 Bovik et al. ................. 382/239
5,528,315 A * 6/1996 Sugiyama .................... 348/714
5,640,210 A * 6/1997 Knee et al. .................. 348/469
5,696,560 A * 12/1997 Songer .................... 348/436.1
5,715,382 A * 2/1998 Herregods et al. ......... 358/1.18
6,005,625 A * 12/1999 Yokoyama ............. 375/240.16
6,062,604 A 5/2000 Taylor et al.
6,273,473 B1 8/2001 Taylor et al.

(Continued)

OTHER PUBLICATIONS

European Search Report from applicants' corresponding European patent application.

*Primary Examiner*—Kambiz Zand
*Assistant Examiner*—Yonas Bayou
(74) *Attorney, Agent, or Firm*—Fisher, Christen & Sabol

(57) ABSTRACT

The invention relates to a packaging material with a forgery-proof security feature, whereby the security feature comprises a coded image arrangement which is provided on the packaging material and which reveals an image or image sequence by superimposing a related decoder element. The invention is characterized in that the decoder element is a transparent or translucent, film-type object with a line or column-type pattern made up of lines or columns lined up parallel to each other specific distances apart, and the image arrangement on the packaging material contains a plurality of coded individual images that mix into each other, whereby the coded individual image is an arrangement of strip-shaped image elements that are spaced apart and are co-ordinated in terms of orientation and distance from each other with respect to the line or column pattern of the decoder element, such that by overlapping the image arrangement and the decoder element and lateral displacement of the decoder element over the image arrangement, an image sequence that to the human eye appears to be moving is obtained and, depending on the position of the decoder element the coded individual images are covered or are visible by means of the window regions lying between the lines or columns and, in combination with the line or column-type pattern of the decoder element, fit together to make up recognizable images.

43 Claims, 2 Drawing Sheets

U.S. PATENT DOCUMENTS

Figure 1A:
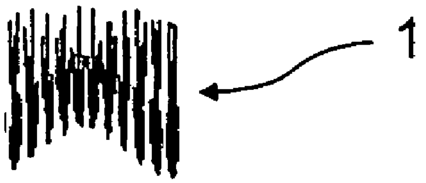

| | | | | |
|---|---|---|---|---|
| 6,317,226 | B1 * | 11/2001 | Yeh et al. | 359/2 |
| 2002/0008380 | A1 | 1/2002 | Taylor et al. | |
| 2002/0185857 | A1 * | 12/2002 | Taylor et al. | 283/72 |
| 2003/0193183 | A1 | 10/2003 | Taylor et al. | |
| 2003/0193184 | A1 | 10/2003 | Taylor et al. | |

* cited by examiner

FORGERY-PROOF PACKAGING MATERIAL WITH A SECURITY FEATURE

This U.S. application has priority of European Patent Application No. 03405776.0, filed Oct. 28, 2003.

The present invention relates to a packaging material with a forgery-proof security feature, whereby the security feature comprises a coded image arrangement which is provided on the packaging material and which reveals an image or image sequence by superimposing a related decoder element on it.

Proof against forgery is gaining ever increasing importance in connection with packaging, in particular in the pharmaceutical industry forgery-proof forms of packaging contain a guarantee of original product which enables the customer or a particular group of people to recognise that the product in question really has been produced and packaged by the desired manufacturer or a third party company entrusted therewith.

As a rule, forgery-proof items such as e.g. documents, bonds, consumer goods, spare parts etc. or the related packaging contain so-called security features which are put on the surface of the item. Preferred security features are characterised by way of images which are achieved by various means and which to the human eye appear to change. Known for example are security features which allow different image elements to be seen by changing the angle of viewing and produce the impression of a moving image. Known forgery-proof forms of packaging and products have on their surface a hologram which change their appearance on changing the angle of viewing. The production of holograms is however very expensive.

Also known are security features that contain a coded image on the packaging and which, on superimposing a so-called decoder element, reveals the coded image. The decoder element contains e.g. a number of optical lenses which deflect the underlying image elements, that appear to the human eye to be a random pattern, in such a manner that the image elements fit together to form a recognisable image. The apparently random pattern is thereby made to suit the optics of the lens elements used. The production of such coded images for decoding with a decoder element containing optical lenses requires complex data processing programs. Further, the production of the lenticular lenses needed for decoding purposes—usually made by casting and requiring a high degree of accuracy—is technically very complicated.

Also known are security features that contain an apparently random pattern and involves a decoder element in the form of a transparent object which bears an apparently random pattern. By superimposing the two apparently random patterns a recognisable image or pattern is obtained, whereby both apparently random patterns must be aligned very accurately. The images obtained this way, however, do not move.

The use of so-called decoder elements has the advantage that these may be distributed separate from the packaging to the end user or checking authority. They are therefore a kind of key. On the other hand the conventional security features with decoder elements which create moving images on decoding suffer the disadvantage that—as already mentioned—these are relatively complicated and expensive to produce.

The object of the present invention is therefore to propose a packaging material with a security feature produced during its manufacture, whereby the security feature comprises a coded image arrangement that covers at least a part of the surface of the packaging material and a decoder element for decoding the coded image arrangement to produce an optical effect. The security feature should also exhibit a high degree of security against forgery.

That objective is achieved by way of the invention in that the decoder element is a transparent or translucent, film-type object with a line or column-type pattern made up of lines or columns lined up parallel to each other specific distances apart, and the image arrangement on the packaging material contains a plurality of coded individual images that mix into each other, whereby the coded individual image is an arrangement of strip-shaped image elements that are spaced apart and are coordinated in terms of orientation and distance from each other with respect to the line or column pattern of the decoder element, such that by overlapping the image arrangement and the decoder element, and lateral displacement of the decoder element over the image arrangement, an image sequence that to the human eye appears to be moving is obtained in that, depending on the position of the decoder element, the coded individual images are covered or are visible by means of the window regions lying between the lines or columns, and in combination with the line or column-type pattern of the decoder element, fit together to make up recognisable individual images.

On superimposing the decoder element over the coded image arrangement, the lines or columns of the decoder element cover a number of the strip-shaped coded individual images. However, at least one of the coded individual images lies aligned with the window regions between the line or column-type pattern of the decoder element with the result that the visible strip-shaped image elements of at least one coded individual image complement the line or column-type pattern of the decoder to form an optically recognisable image.

By lateral displacement of the decoder element other, previously hidden coded individual images become visible or decoded, while the previously visible individual images are again partially or wholly covered by the line or column-type pattern of the decoder element and are therefore no longer recognisable.

The various individual images differ from each other preferably with respect to the motif shown and/or the shades of grey or contrast so that on using the decoder element an optically dynamic image sequence i.e. a moving image is created.

The individual images may be arranged e.g. into an image arrangement. In a preferred version of the invention the individual images overlap partially or completely with a particular degree of offset. The overlapping is thereby such that strip-shaped image elements of a coded image are arranged in the spaces of the neighbouring coded individual image.

The decoder element is preferably made of a transparent plastic film. The decoder element is advantageously an object that is independent from the said packaging material and is supplied together with or separate from the packaging containing the related coded image arrangement.

The line-type pattern of the decoder element is preferably made up of parallel, spaced lines or columns that cover over the—preferably directly—underlying strip-shaped image elements. The spaces between the lines or columns form the so-called window regions through which the underlying strip-shaped image elements become visible. The said window regions may have the same breadth as the lines of columns of the pattern.

In a preferred version of the invention, however, the breadth of the lines or columns of the pattern are a multiple of the breadth of the window regions in between. For example the breadth of the lines or columns may be 2 to 20 times, in particular 3 to 10 times the breadth of the spaces in the window regions. The greater the resolution of the image sequence i.e. the more closely the individual images are mixed into each other the greater is this factor.

However, the window regions, and the line or column-type pattern of a decoder element, are preferably always of the same breadth.

The maximum breadth of the strip-shaped image elements usefully corresponds to the breadth of the window regions. However, the maximum breadth of the image elements may be greater than the breadth of the window regions.

If the strip-shaped image elements of the coded individual image lie in the window region between the decoder lines, then the spaces between the image elements are covered by the line or column-type pattern. The eye then complements the visible strip-shaped image elements with the lines or columns of the decoder element to give a recognisable individual image. The strip-shaped image elements of the rest of the individual images or neutral regions are then covered over by the line or column-type pattern of the decoder element.

The coded image arrangement and the decoder element may be matched to each other in such a manner that the said optical effect occurs by rotating or lateral displacement of the decoder element with respect to the image arrangement. In a preferred version of the invention the optical effect is achieved by a straight line lateral displacement of the decoder with respect to the image arrangement. The effect of a moving image is in particular achieved by uniform displacement of the decoder element over the image arrangement.

The coded image arrangement is preferably such that it forms a uniform decorative structure. The ornamental image arrangement may be achieved e.g. by the partial or complete overlapping or mixing of the coded individual images, in particular numbers, letters, words or signs. The ornamental impression may also be reinforced by the repetition of individual images in that the coded image arrangement yields an ornamental image that repeats itself along its longitudinal direction i.e. in the direction of movement of the decoder element.

In a preferred version of the invention the coded image arrangement is made up of a single basic element which is aligned in a row in multiple. The basic element may hereby, depending on the desired length of decoded image arrangement on the packaging, be aligned n-times without interruption on the packaging. Thereby, on moving the decoder, the decoded image sequence repeats itself according to the number of basic elements that have been put together.

The basic element itself contains the necessary coded individual images. The individual images are arranged in the basic element in such a manner that by fitting the basic elements to form a coded image arrangement, a continuous sequence of individual images is obtained on using the decoder element. As the individual images are mixed into each other, the various individual images are not necessarily shown completely in the basic element. More likely is that a part of a particular image is arranged at the left hand side and the rest of the image in question is arranged on the right hand side of the basic element.

By continually repeating the basic element the coded image arrangement acquires a regular ornamental structure. The viewer sees a decorative element in such an ornamental structure; the real purpose of a security feature remains hidden.

The linear arrangement of a coded image created by continuous repetition of a basic element can be printed in an endless manner on the packaging material in the direction of feed in the machine i.e. in the direction of movement of the packaging material. This enables the coded image to be deposited using a cost favourable scatter printing method in which only two degrees of freedom have to be specified to fix the position for printing. The coded image may however also be created by transfer printing in which four degrees of freedom are necessary and by means of which the printed image can be synchronised e.g. via the position of blisters.

The individual images may be in the form of letters, numbers, words or combinations thereof, and signs or pictures. Thereby, the individual images are coded in such a way and fitted together into an image arrangement that, on employing the decoder element, these appear as an image sequence of the said letters, words, numbers or picture moving in the direction of movement of the decoder. The representation created by the decoder can also be a moving, but ever repeating sequence of letters, words, numbers, signs or pictures. Combinations of the above mentioned elements are also possible.

Further, the sequence of moving or travelling letters, numbers words or signs may be subjected to different degrees of shadow. The changing shadow effect may be expressed by changes in the degrees of greyness.

The image arrangement is preferably a black-white representation i.e. the strip-shaped image elements are preferably black while the spaces between the image elements are white. The spaces may however also take on the background colour of the packaging material. In this case the line or column-type pattern of the decoder element is usefully also black.

It is also advantageous for the difference in the kind of colour, brightness and/or intensity of colour in the image arrangement and the spaces to be as great as possible so that the maximum degree of contrast between the image elements and the spaces is obtained.

The coded image arrangement or image elements may, however, also be coloured and if desired complement the optical effect by specific colouring by additional colour-induced effect.

The line or column-type pattern of the decoder element and the strip-shaped image elements of the coded individual images are usefully always of the same colour. Further, the spaces between the image elements and the regions at the top and the bottom bordering on the strip-shaped image elements are usefully of the same colour.

A further development of the invention is such that means may be provided to assist with the direction of movement and alignment of the decoder element over the coded image arrangement, thus permitting accurate guidance of the decoder element over the image arrangement on the packaging material and, therefore, optimal creation of the optical effect.

The safety feature is usefully created by a data processing device and the appropriate software. The image data and are then—for preparation and processing purposes—preferably displayed on a screen.

In a first step uncoded individual images in electronic form are created according to requirements. The individual images may be created electronically using a graphics program or transferred using an optical scanner from an analogue image, digitalised and processed into an electronic form. Further image processing steps may then follow.

The lie or column-type pattern of the related decoder element is likewise created in electronic form using data processing facilities.

In the next step the individual images are coded on the basis of the decoder column-type pattern i.e. transformed to strip-shaped image elements that are spaced apart. This takes place preferably by cancelling or blanking out—likewise strip-shaped—spaces between the remaining elements of the original individual image.

The coding of the individual image takes place e.g. by overlapping the individual image with a so-called mask, whereby those parts of the image which should be visible—in terms of image processing—are masked. The mask is a line or column-type pattern corresponding to the decoder element. The image elements of the original image which are not required to create the decode image are subsequently blanked out. This way a coded individual image is created from parallel, spaced strip-shaped image elements. The creation of the coded individual image may be performed manually on a screen or in the background by an independent data processing program according to instructions by an operator.

In the last case, after feeding in certain boundary conditions, the data processing program calculates, on the basis of the decoder column-type pattern present in electronic form, the spaces in the original image that have to be removed and performs the coding of the individual image.

After coding the individual images, these are put together in their final position to form a coded image arrangement. Thereby, the individual images may overlap partially or wholly with a certain degree of offset, this in such a manner the strip-shaped image elements of an individual image occupy the spaces of the neighbouring individual image.

In an especially preferred version of the invention the process for producing the coded individual images contain a correction which is takes into consideration the properties of the printing method employed to deposit the coded image arrangement and the decoder element on the substrates in question, the properties of the printing medium and the properties of the substrates such as paper, coated paper or plastics. This concerns a correction of the growth of the dot or line created by the printing method.

This correction is of great significance as, depending on the printing method, substrate and medium employed, the breadth of the strip-shaped image elements or lines of the decoder element may deviate from the original breadth calculated by the data processing program e.g. by the ink running on the substrate surface or due to the substrate sucking up the said printing medium.

Further, as a rule the line or column-type pattern of the decoder element and the coded image arrangement on the different types of substrate are printed if desired using different methods of printing. Therefore, e.g. the line or column-type pattern of the decoder element is deposited on a transparent plastic film, while the coded image arrangement is possibly printed on re-packaging material made of cardboard.

The printing of the coded image arrangement on the packaging is preferably performed using a photogravure printing method, whereby the correction of the dot or line growth after taking into consideration the main parameters, provides the starting values for calculating the dimension of the engraving in the printing cylinder or provides the said dimensions itself. The dimensions of the engraving i.e. in particular the breadth and depth of the recesses accommodating the printing ink are thereby determined such that the printing reproduces the desired breadth of strip-shaped image element or lines of the decoder element.

The packaging material bearing the security feature according to the invention is preferably employed for manufacture packaging for pharmaceutical products. The forms of packaging may e.g. be primary forms of packaging such as e.g. blister packs. The security feature according to the invention may also be deposited on secondary forms of packaging. Such secondary forms of packaging which contain the primary forms of packaging may be e.g. boxes, in particular foldable boxes.

The packaging material bearing the security feature according to the invention may also be employed for manufacturing packaging for foodstuffs, animal fodder, cosmetics, semi-luxury goods or consumer goods.

In principle it is also conceivable to deposit the security feature according to the invention on the surface of the product itself, such as on spare parts. The security feature according to the invention may also be deposited on documents or bonds.

The pharmaceutical products may e.g. be in the form of tablets, pills, powders pastes or liquids. The packaging for these may be e.g. in the form of blister packs for tablets and ampoules, bottles, pouches or tubes.

The security feature according to the invention employing a decoder element has the advantage that the ornamental image arrangement on the packaging is—for an uninformed, external person e.g. an unsuspecting forger—not directly recognisable as a security feature but is rather taken for an image of a decorative nature. Further, the creation of the security feature and the deposition of the security feature on the packaging is inexpensive. At the same time by creating moving images on decoding the image arrangement one achieves a high quality and extremely appealing security feature.

The proof against forgery is achieved by the high degree of resolution of the coded individual images and the decoder elements. This makes it difficult for the coded image arrangement to be scanned and the decoder element to function with instruments of inadequate resolution. Also the forger is forced to print the security feature on high grade printing units, which increases the expenditure and makes forgery uninteresting.

Figure 1B:
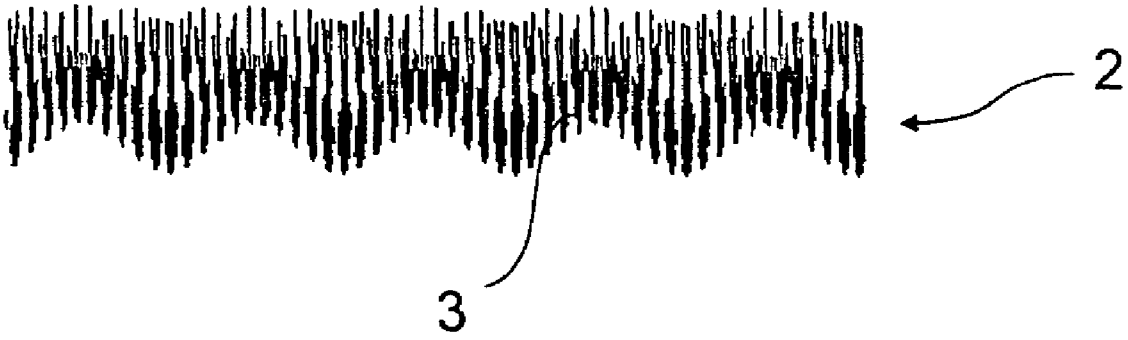
Figure 2:
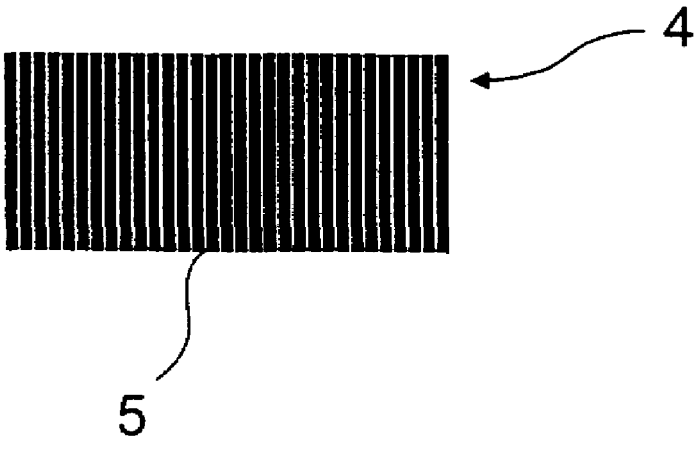
Figure 3A:
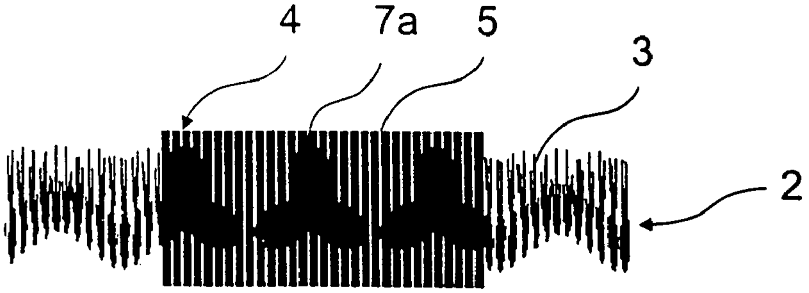
Figure 3B:
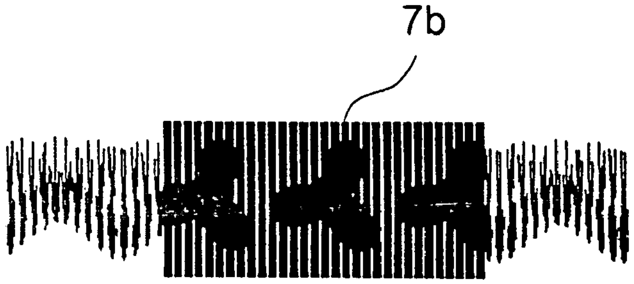
Figure 3C:
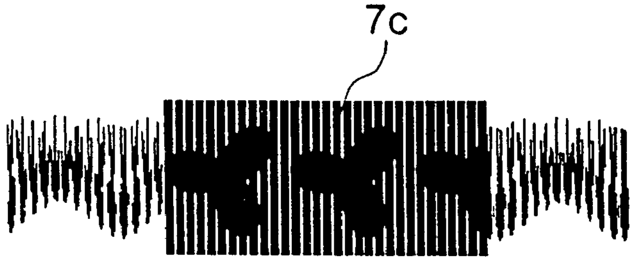
Figure 3D:
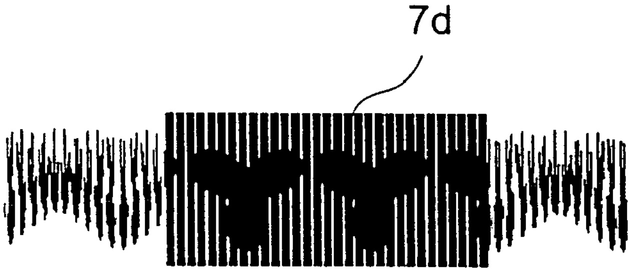
Figure 3E:
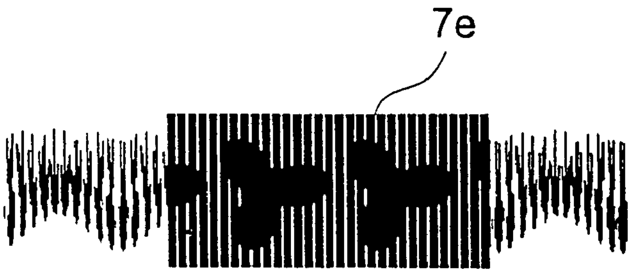
Figure 3F:
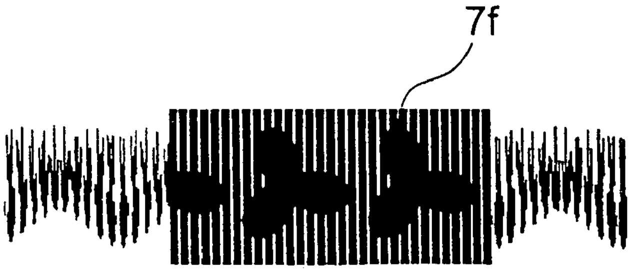

The invention is described in greater detail in the following by way of example and with reference to the accompanying drawings which show in;

FIG. 1*a*: a basic element of a coded image arrangement in ornamental form;

FIG. 1*b*: a coded image arrangement made up of a plurality of basic elements as in FIG. 1 a arranged continuously in a row;

FIG. 2: a decoder-element;

FIG. 3*a-f*: a sequence of individual images decoded using a decoder element;.

FIG. 1*b* shows a coded image arrangement 2 made up of a plurality interacting of coded individual images, whereby strip-shaped image elements 3 of the various individual images are arranged mixing into each other. By the coding of the individual images to make up an arrangement of strip-shaped image elements 3 and by mutual overlapping, the coded image arrangement acquires an ornamental appearance. The individual images contributing to this are not recognisable and can be only when using a decoder element 4.

FIG. 2 shows a related decoder element 4 which reveals the individual images 7*a-f*. The decoder element comprises a transparent, flexible plastic film and contains a pattern of lines 5 printed on the plastic film.

FIGS. 3*a-f* show a sequence of decoded individual images 7*a-f* as they are viewed on laying the decoder element 4 over the coded image arrangement 2 and moving the decoder element 4 laterally in a straight line. The sequence of the decoded images reflects different positions of the decoder element 4 over the coded image arrangement 2. In the present case the decoded individual images 7*a-f* lie in the form of leaves in three parts in different positions of rotation.

If the decoder element 4 is passed over the coded image arrangement 2, then the viewer sees a leaf in three parts which appears to rotate in the direction of movement of the decoder element 4. By means of relative movement of the decoder element 4 with respect to the image arrangement at constant speed, the decoded individual images 7*a-f* are perceived as a moving image sequence as in a film.

The rotational movement of the three-part leaf in the static images in FIGS. 3*a-f* created by displacement of the decoder element 4 is created by an overall displacement of the decoder element amounting to about only one column width.

The coded image arrangement 2 is made up of any repetition of the basic element (FIG. 1*a*). That is, depending on the desired overall length, the coded image arrangement 2 is made up of n-times uninterrupted repitition of the basic element 1. This way the decoded image sequence repeats itself as often as desired by continuous displacement of the decoder element 4.

By continuous repetition of the basic element 1 the coded image arrangement 2 also becomes a regular, ornamental structure.

The basic element 1 itself contains the necessary coded individual images which make an uninterrupted sequence of the individual images possible by alignment of a plurality of basic elements. As the individual images are mixed into each other, the various individual images in the basic element are not necessarily shown completely. More likely is, e.g. that a part of certain images are arranged at the left hand side and the complementary part of the related image arranged at the right hand side of the basic element 1.

The above individual images in the form of a three-part leaf are to be understood as an example. The principle described by FIGS. 1-3 can also be carried out with other suitable individual images.

The invention claimed is:

1. A packaging material with a forgery-proof security feature and an associated decoder element, whereby the security feature comprises a coded image arrangement with individual images of strip-shaped image elements provided on the packaging material and which reveals an image or image sequence by superimposing a related decoder element, the decoder element is a transparent or translucent, film-type object with a line of column-type pattern made up of lines or columns lined up parallel to each other specific distances apart, and the coded image arrangement on the packaging material is a row of many single basic elements of coded individual images that mix into each other with different orientations, whereby the basic elements repeat themselves in a regular manner along the direction of displacement of the decoder element, with result that the coded image arrangement forms a uniform, ornamental-type of pattern that runs in the longitudinal direction of the coded image arrangement, whereby the coded individual images are an arrangement of strip-shaped image elements that are spaced apart and are coordinated in terms of orientation and distance from each other with respect to the line or column pattern of the decoder element, such that by overlapping the image arrangement and the decoder element and lateral displacement of the decoder element over the image arrangement, an image sequence that to the human eye appears to be moving is obtained in that, depending on the position of the decoder element, the coded individual images are covered by the line or column pattern or are visible by means of a window region lying between the lines or columns and, in combination with the line or column-type pattern of the decoder element, fit together to make up recognizable individual images with different orientations.

2. The packaging material according to claim 1, wherein the decoder element is made out of a transparent, flexible plastic film.

3. The packaging material according to claim 1, wherein the individual images represent letters, words, numbers, signs or a combination of these elements, which are coded in such a manner that, on using the decoder element, they appear as an image sequence.

4. The packaging material according to claim 1, wherein the individual images represent letters, words, numbers, signs or a combination of these elements, which repeat themselves in a regular manner along the direction of displacement of the decoder element, with the result that coded image arrangement forms a uniform, ornamental-type of pattern that runs in the longitudinal direction of the coded image arrangement.

5. The packaging material according to claim 1, wherein the coded image arrangement is made up of a plurality of single basic elements in a row, and the coded individual images are built into the basic element in such a manner that, by aligning a row of many basic elements to make a coded image arrangement, a sequence of decoded individual images without interruption is obtained on using a the decoder element.

6. The packaging material according to claim 1, wherein the moving image sequence has changing shadow effects in the individual images.

7. A The packaging material according to claim 1, wherein the coded image arrangement and the line or column-type pattern of the decoder element are dark in color, and the spaces are light in color.

8. A process for manufacturing a security feature for packaging material according to claim 1, wherein the security feature is created by means of a data processing facility employing a data processing program, the individual images and the line or column-type pattern of the decode element are prepared in electronic form, and the individual images on the basis of the line or column-type pattern are converted into an arrangement of strip-shaped image elements which are spaced apart and are parallel to each other, and the individual images coded in this manner are assembled, with mutual overlapping, into a coded image arrangement, whereby in order to calculate the breadth of the image arrangements and the breadth of striped pattern of the decoder element, a correction allowing for growth of the dots or lines is made, which takes into account the properties of the printing process used to produce the coded image arrangement and the decoder elements, the properties of the printing inks and the properties of the substrate to be printed on.

9. The process according to claim 8, wherein the coded image arrangement is printed onto the packaging material using a photogravure printing process and the correction for the growth of the dots or lines provides the starting values for the purpose of calculating the dimensions of the engraving on the printing cylinder or the dimensions itself, whereby dimensions of the engraving of the recesses accommodating the printing inks are chosen such that the printed image arrangement reproduces the desired breadth of the strip-shaped image elements.

10. The process according to claim 8, wherein the coded image arrangement is made up of a plurality of basic elements which are repeated without interruption, and these are printed on the packaging material in an endless manner in the direction of movement of the packaging material.

11. A process comprising utilizing the packaging material according to claim 1 to manufacture a primary or secondary form of packaging for foodstuffs, semi-luxury items, cosmetics, consumer goods or pharmaceutical products.

12. The packaging material according to claim 2, wherein the coded image arrangement is shown on the packaging material such that it constitutes an ornamental-like structure.

13. The packaging material according to claim 2, wherein the individual images represent letters, words, numbers, signs or a combination of these elements, which are coded in such a manner that, on using the decoder element, they appear as an image sequence moving or traveling in the direction of displacement of the decoder element.

14. The packaging material according to claim 1, wherein the individual images represent letters, words, numbers, signs or a combination of these elements, which are coded in such a manner that, on using the decoder element, they appear as an image sequence moving or traveling in the direction of displacement of the decoder element.

15. The packaging material according to claim 2, wherein the individual images represent letters, words, numbers, signs or a combination of these elements, which repeat themselves in a regular manner along the direction of displacement of the decoder element, with the result that coded image arrangement forms a uniform, ornamental-type of pattern that runs in the longitudinal direction of the coded image arrangement.

16. The packaging material according to claim 1, wherein the individual images represent letters, words, numbers, signs or a combination of these elements, which repeat themselves in a regular manner along the direction of displacement of the decoder element, with the result that coded image arrangement forms a uniform, ornamental-type of pattern that runs in the longitudinal direction of the coded image arrangement.

17. The packaging material according to claim 3, wherein the individual images represent letters, words, numbers, signs or a combination of these elements, which repeat themselves in a regular manner along the direction of displacement of the decoder element, with the result that coded image arrangement forms a uniform, ornamental-type of pattern that runs in the longitudinal direction of the coded image arrangement.

18. The packaging material according to claim 2, wherein the coded image arrangement is made up of a plurality of single basic elements in a row, and the coded individual images are built into the basic element in such a manner that, by aligning a row of many basic elements to make a coded image arrangement, a sequence of decoded individual images without interruption is obtained on using a decoder element.

19. The packaging material according to claim 1, wherein the coded image arrangement is made up of a plurality of single basic elements in a row, and the coded individual images are built into the basic element in such a manner that, by aligning a row of many basic elements to make a coded image arrangement, a sequence of decoded individual images without interruption is obtained on using a decoder element.

20. The packaging material according to claim 3, wherein the coded image arrangement is made up of a plurality of single basic elements in a row, and the coded individual images are built into the basic element in such a manner that, by aligning a row of many basic elements to make a coded image arrangement, a sequence of decoded individual images without interruption is obtained on using a decoder element.

21. The packaging material according to claim 4, wherein coded image arrangement is made up of a plurality of single basic elements in a row, and the coded individual images are built into the basic element in such a manner that, by aligning a row of many basic elements to make a coded image arrangement, a sequence of decoded individual images without interruption is obtained on using a decoder element.

22. The packaging material according to claim 2, wherein the moving image sequence has changing shadow effects in the individual images.

23. The packaging material according to claim 1, wherein the moving image sequence has changing shadow effects in the individual images.

24. The packaging material according to claim 3, wherein the moving image sequence has changing shadow effects in the individual images.

25. The packaging material according to claim 4, wherein the moving image sequence has changing shadow effects in the individual images.

26. The packaging material according to claim 5, wherein the moving image sequence has changing shadow effects in the individual images.

27. The packaging material according to claim 2, whereby the coded image arrangement and the line or column-type pattern of the decoder element are dark in color, and the spaces are light in color.

28. The packaging material according to claim 1, wherein the coded image arrangement and the line or column-type pattern of the decoder element are dark in color, and the spaces are light in color.

29. The packaging material according to claim 4, wherein the coded image arrangement and the line or column-type pattern of the decoder element are dark in color, and the spaces are light in color.

30. The packaging material according to claim 4, wherein the coded image arrangement and the line or column-type pattern of the decoder element are dark in color, and the spaces are light in color.

31. The packaging material according to claim 5, wherein the coded image arrangement and the line or column-type pattern of the decoder element are dark in color, and the spaces are light in color.

32. The packaging material according to claim 6, wherein the coded image arrangement and the line or column-type pattern of the decoder element are dark in color, and the spaces are light in color.

33. The process according to claim 9, wherein the coded image arrangement is made up of a plurality of basic elements which are repeated without interruption, and these are printed on the packaging material in an endless manner in the direction of movement of the packaging material.

34. A process of utilizing the packaging material according to claim 2 to manufacture a primary or secondary form of a packaging for foodstuffs, semi-luxury items, cosmetics, consumer goods or pharmaceutical products.

35. A process of utilizing the packaging material according to claim 1 to manufacture a primary or secondary form of a packaging for foodstuffs, semi-luxury items, cosmetics, consumer goods or pharmaceutical products.

36. A process of utilizing the packaging material according to claim 3 to manufacture of a primary or secondary form of a packaging for foodstuffs, semi-luxury items, cosmetics, consumer goods or pharmaceutical products.

37. A process of utilizing the packaging material according to claim 4 to manufacture of a primary or secondary form of a packaging for foodstuffs, semi-luxury items, cosmetics, consumer goods or pharmaceutical products.

38. A process of utilizing the packaging material according to claim 5 to manufacture of a primary or secondary form of a packaging for foodstuffs, semi-luxury items, cosmetics, consumer goods or pharmaceutical products.

39. A process of utilizing the packaging material according to claim 6 to manufacture of a primary or secondary form of a packaging for foodstuffs, semi-luxury items, cosmetics, consumer goods or pharmaceutical products.

40. A process of utilizing the packaging material according to claim 7 to manufacture a primary or secondary form of a packaging for foodstuffs, semi-luxury items, cosmetics, consumer goods or pharmaceutical products.

41. The packaging material according to claim 7, wherein the coded image arrangement and the line or column-type pattern of the decoder element are black, and the spaces are white.

42. The packaging material according to claim 7, wherein the coded image arrangement and the line or column-type pattern of the decoder element are dark in color and the spaces correspond with the background color of the packaging.

43. The packaging material according to claim 9, wherein the breadth and depth of the recesses, accommodating the printing inks, of the engraving are chosen such that the printed image arrangement reproduces the desired breadth of the strip-shaped image elements.

* * * * *